United States Patent
Chen et al.

(10) Patent No.: US 8,516,143 B2
(45) Date of Patent: Aug. 20, 2013

(54) TRANSMITTING DATA WITHIN REMOTE APPLICATION

(75) Inventors: Danny Y. Chen, Austin, TX (US); Dave Lin, Taipei (TW); Clement Su, Taipei (TW); Meng-Li Wong, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 12/749,566

(22) Filed: Mar. 30, 2010

(65) Prior Publication Data

US 2010/0250771 A1 Sep. 30, 2010

(30) Foreign Application Priority Data

Mar. 31, 2009 (TW) ............................... 98110591 A (51) Int. Cl.
*G06F 15/16* (2006.01)
(52) U.S. Cl.
USPC ............ 709/231; 709/202; 709/205; 709/217
(58) Field of Classification Search
USPC .................. 709/201–205, 217–219, 231–232
See application file for complete search history.

(56) References Cited

U.S. PATENT DOCUMENTS

| | | | | |
|---|---|---|---|---|
| 6,668,046 B1 * | 12/2003 | Albal | ............................ | 379/119 |
| 6,741,586 B1 | 5/2004 | Schuster et al. | | |
| 7,003,577 B1 * | 2/2006 | Ueda et al. | .................... | 709/230 |
| 7,573,988 B2 * | 8/2009 | Lee et al. | .................... | 379/88.17 |
| 7,619,645 B2 * | 11/2009 | Cockerton | ................ | 348/14.13 |
| 7,620,899 B2 * | 11/2009 | Abdo et al. | ................... | 709/203 |
| 7,751,347 B2 * | 7/2010 | Giroti | ......................... | 370/260 |
| 7,886,050 B2 * | 2/2011 | Raja et al. | ..................... | 709/202 |
| 7,991,916 B2 * | 8/2011 | Meek et al. | ................... | 709/204 |
| 8,135,843 B2 * | 3/2012 | Kramer | ......................... | 709/217 |
| 2007/0041462 A1 | 2/2007 | Kim | | |
| 2008/0016539 A1 | 1/2008 | Na | | |
| 2010/0250771 A1 * | 9/2010 | Chen et al. | .................... | 709/231 |
| 2011/0145431 A1 * | 6/2011 | Momchilov et al. | .......... | 709/231 |

FOREIGN PATENT DOCUMENTS

| | | |
|---|---|---|
| WO | 2004014059 A2 | 2/2004 |
| WO | 2008107810 A1 | 9/2008 |

* cited by examiner

*Primary Examiner* — Bharat N Barot
(74) *Attorney, Agent, or Firm* — Yee & Associates, P.C.; Yeen Tham (57) ABSTRACT

A device, method and computer program product for transmitting data within remote application are disclosed. The method includes the following steps: detecting a connection attribute with a receiver; selecting an available transmission condition according to the detected connection attribute; and transmitting an audio data and/or a video data to the receiver responsive to a determination that the available transmission condition is fulfilled.

20 Claims, 10 Drawing Sheets

High Speed Connection

| Criteria | Enable? |
|---|---|
| Continuous Audio | Yes |
| Continuous Video | Yes |

FIG.5A

Medium Speed Connection

| Criteria | Enable? |
|---|---|
| Continuous Audio | Yes |
| Continuous Video | No |
| Advance Setting | Video Capture? |
| 1 | Automatic Transmission Interval | Yes |
| 2 | Page Flip | Yes |
| 3 | Region Selection | Yes |
| 4 | Presentation Pause | No |
| 5 | Image Unchanged | No |
| 6 | Keyword | Yes |
| 7 | Region Move | Yes |

FIG.5B

Low Speed Connection

| Criteria | | Enable? |
|---|---|---|
| Continuous Audio | | No |
| Continuous Video | | No |
| Advance Setting | | Audio Capture? |
| 1 | Over Background Threshold Value | Yes |
| Advance Setting | | Video Capture? |
| 1 | Short-Cut Key | Yes |

TRANSMITTING DATA WITHIN REMOTE APPLICATION

CROSS REFERENCE TO RELATED APPLICATIONS

This application claims priority of Taiwan Patent Application Serial No. 98110591 entitled "DEVICE, METHOD AND COMPUTER PROGRAM PRODUCT FOR TRANSMITTING DATA WITHIN REMOTE APPLICATION", filed on Mar. 31, 2009.

TECHNICAL FIELD

The present invention relates to device, method and computer program product for transmitting data within a remote application, and more particularly to device, method and computer program product for transmitting data by using selective capturing within a remote application.

BACKGROUND OF THE INVENTION

Internet has become an important technology as a platform for the purpose of work, play, social, advertisement and many other activities. As the Internet becomes more and more powerful, the technical structure and relationship between service providers also become more and more complicated. For example, the users around the world may still join a video-conference at the same time through the Internet to negotiate with each other or provide presentation or demonstration to others. Such kind of application is referred to as the "Remote Application" herein.

If a lecturer plans to hold a net meeting to introduce a presentation to others, such as new software demonstration or on-line service, he may have several choices from the traditional remote applications. For example, the lecturer may send his presentation file to others via email and than hold a teleconference through the telecommunication service provider. The lecturer may present through the phone and other attendees may listen to his speech while also reference to the presentation file. The general definition of teleconference may be referenced through the following website: http://en.wikipedia.org/wiki/Teleconference or http://www.onconference.com/. However, this kind of remote application cannot provide a real time interaction between the lecturer and the attendees and thus become inefficient and burdensome.

Another common remote application is called a virtual network computer ("VNC"). In this application, a VNC Server and a VNC Client must be installed respectively on the server side and the client side. The image on the server side will be transmitted to the client side and then the client may watch the lecturer's whole operation. Some common VNC applications are RealVNC™ (http://www.realvnc.com/) provided by RealVNC Limited. The details of VNC application may be referred to the following website (http://en.wikipedia.org/wiki/vnc).

Still another remote application provides a dedicated software for remote meeting. All of the attendees may login into a server through a browser or other dedicated client program and the lecturer may demonstrate all or a part of his screen to the attendees, such as the Lotus Sametime™ provided by IBM (http://www-01.ibm.com/software/lotus/products/sametime/web-conferencing.html).

A new remote application is introduced recently based on a virtual world derived from web games. For example, the Second Life™ (http://secondlife.com/) provided by Linden Lab just create a 3D virtual world, which allows all player may "live" and interact with others through his avatar in the virtual world. In this kind of application, the lecturer may hold a presentation in a virtual meeting room in the virtual world and present his speech to all attendees in the same virtual meeting room. Thus, all of the attendees may experience a lecture just like he may attend in the real world. An example of the virtual meeting room is the business center of IBM in the Second Life (http://www.ibm.com/3dworlds/businesscenter/us/en/).

Although the above three applications may provide a more real-time interaction and experience, they all require a large bandwidth for transmitting data from the server to the clients and thus lags or delays happen quiet often. Even the users may upgrade their bandwidth to reduce the delay frequency, it is still very possible that important information may be missing due to an accidental delay. Further, the cost for increasing the bandwidth may be huge while the performance is still not satisfying. Moreover, a user on a business travel may have only a low speed connection, which is not capable of performing the above remote applications or just providing a terrible result.

Therefore, it is advantageous to provide device, method and computer program product for efficiently transmitting data within a remote application.

SUMMARY OF THE INVENTION

Responsive to the above-mentioned issues in traditional techniques, several embodiments of the present invention are provided, such as a device, a method and a computer program product for automatically selecting internet browser and providing web service in order to improve one or many issues mentioned above.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

One aspect of the present invention discloses a method for transmitting data within a remote application. The method includes the following steps: detecting a connection attribute with a receiver; selecting an available transmission condition according to the detected connection attribute; and transmitting an audio data and/or a video data to the receiver responsive to a determination that the available transmission condition is fulfilled.

Another aspect of the present invention discloses a computer program product having a program code for performing the following steps upon executing on an electronic device: detecting a connection attribute with a receiver; selecting an available transmission condition according to the detected connection attribute; and transmitting an audio data and/or a video data to the receiver responsive to a determination that the available transmission condition is fulfilled.

Still another aspect of the present invention discloses a device for coupling to a receiver and transmitting data within a remote application. The device includes a detecting module for detecting a connection attribute with the receiver; and a transmitting module for transmitting an audio data and/or a video data to the receiver responsive to a determination that the available transmission condition is fulfilled

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings

DETAILED DESCRIPTION OF THE PREFERRED EMBODIMENTS

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The devices, methods, and computer program products are illustrated in the drawings as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
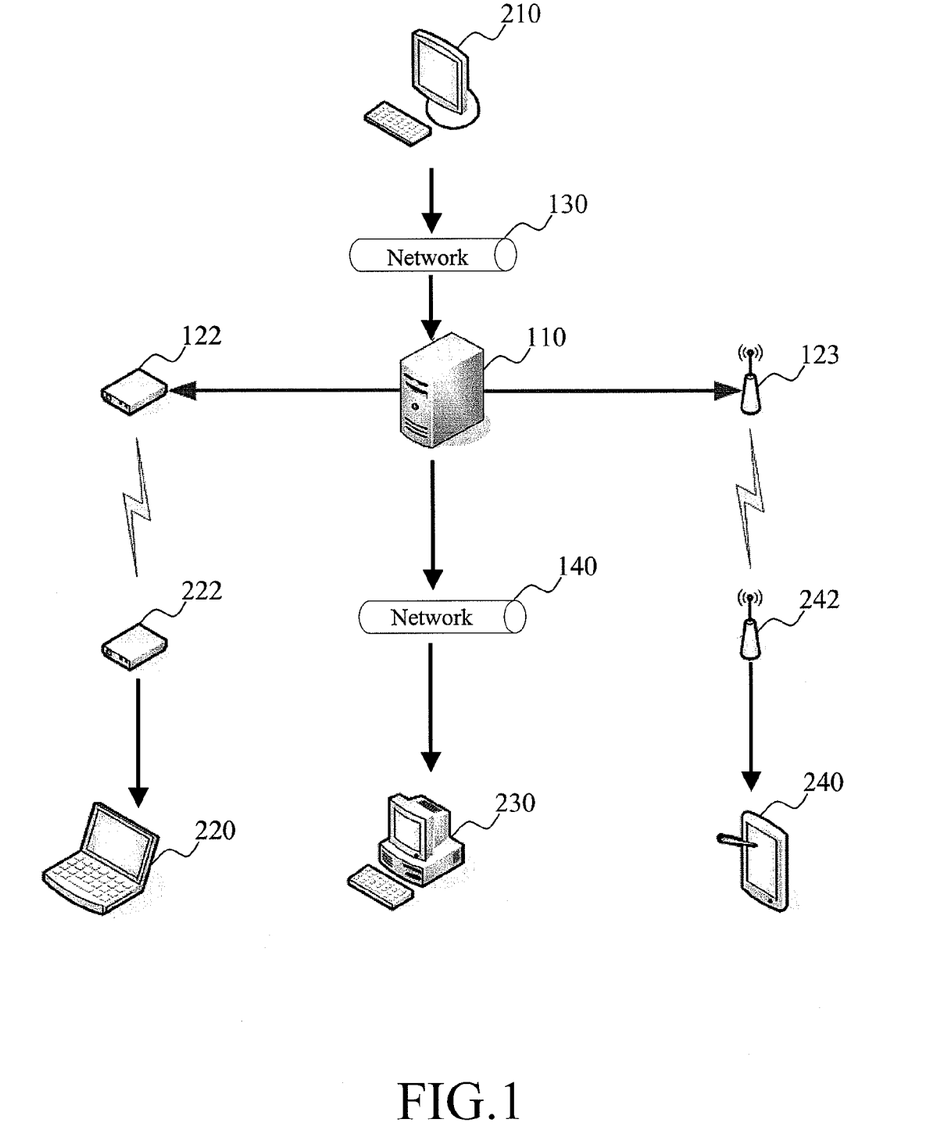
FIG. 1 is an exemplary diagram of system according to an embodiment of the present invention.

FIG. 1 is an exemplary diagram of system according to an embodiment of the present invention. In this exemplary embodiment, the system includes a server 110, clients 210, 220, 230 and 240, which may be coupled and communicated with each other by any hardware structures or software protocols, such as Internet structure and TCP/IP protocols, or any other communication techniques. The detailed descriptions hereunder are illustrated for exemplary purpose in order to facilitate those skilled in the art to clearly understand the present invention. For example, a person wants to hold a net conference and provide a presentation to other attendees within a remote application in accordance with one embodiment of the present invention, in order to demonstrate the operations and characteristics of newly developed software. The lecturer decides to use a high performance desktop computer (hereinafter the "client 201") with a broadband connection 130 (e.g. optical fiber connection) coupling to the server 110 in order to provide a better performance. In other words, the connection between the client 210 and the server 110 is capable of transmitting the audio/video requiring a huge transmission loading. However, other attendees may uses different connections depending on their actual conditions. An attendee A, being on his business travel, uses only a portable notebook (hereinafter the "client 220") with a low speed modem 122 dialing up through a local service provider to communicating with the server 110. In other words, the client 220 may only provide a minimum amount of data transmission. Another attendee B, located at the headquarter, may use a dedicate computer (hereinafter the "client 230") with a high-speed broadband connection (e.g. a fix network) coupling to the server 110. Therefore, the client 230 may also provide the full capacity of transmitting the audio/video data. As to the last attendee C, who cannot arrive the office on time, uses a smart phone (hereinafter the "client 240") with a wireless communicator 242 connecting to the access point 123 of the server 110 (e.g. Wifi, 3G or other wireless connection). In other words, the client 240 may provide a medium capacity of transmitting the audio/video data. Under the condition described above, the system according to one embodiment of the present invention may still hold the net meeting successfully and smoothly despite of the variety of connection devices while still provide all necessary information to the attendees. All attendees will not miss any important information and the bandwidth of the connection may be utilized efficiently. Please note that the above details, such as the quantity and characteristic of the connections and devices, are illustrated for exemplary purpose rather than limitations to the present invention.

Figure 2:
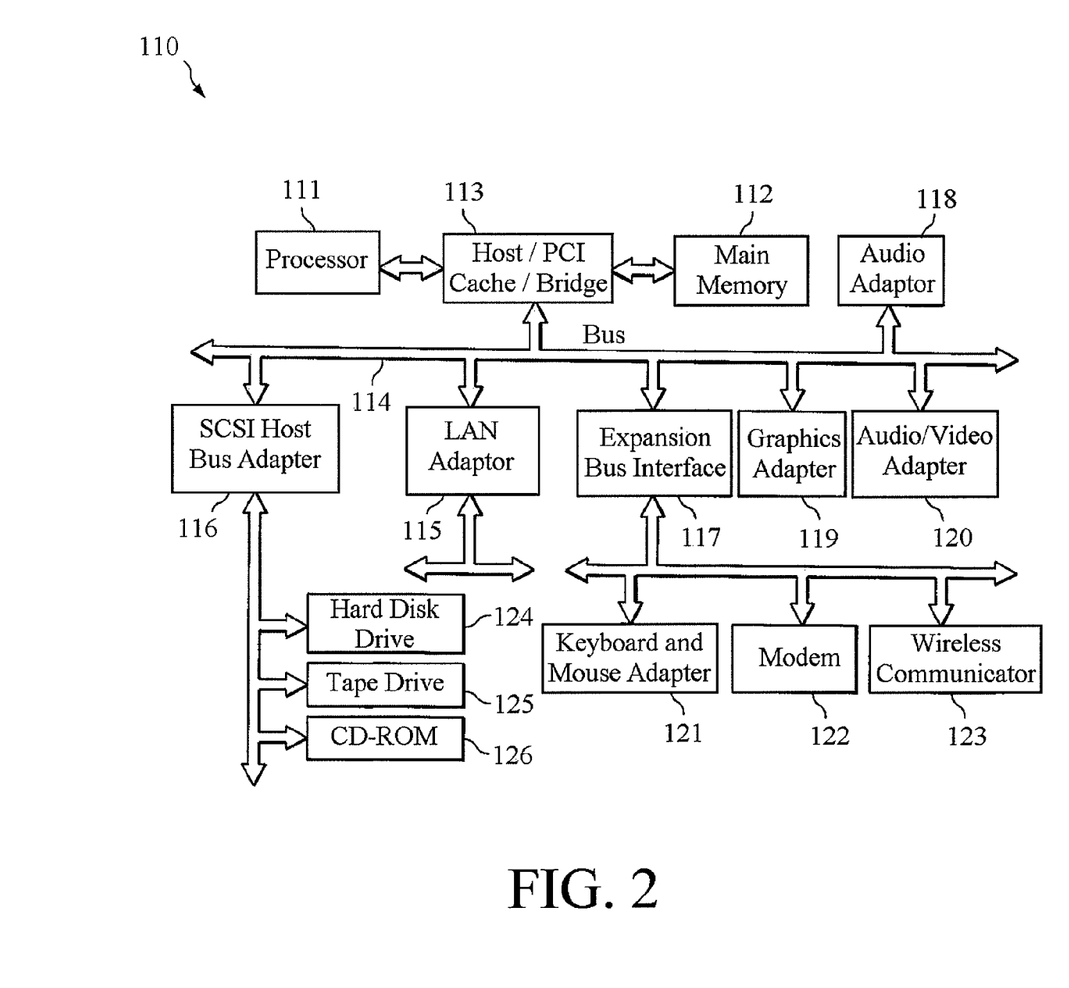
FIG. 2 is an exemplary diagram of server according to an embodiment of the present invention.

The server 110 may be embodied as a computer according to one embodiment of the present invention. For example, FIG. 2 is an exemplary block diagram of the server 110 according to one embodiment of the present invention. In this example, the server 110 is a general-purpose computer, in which code or instructions implementing the processes of the present invention may be located. The server 110 employs a peripheral component interconnect (PCI) local bus architecture 114. Although the depicted example employs a PCI bus, other bus architectures such as Accelerated Graphics Port (AGP) and Industry Standard Architecture (ISA) may be used. Processor 111 and main memory 112 are connected to PCI local bus 114 through PCI bridge 113. PCI bridge 113 also may include an integrated memory controller and cache memory for processor 111. Additional connections to PCI local bus 113 may be made through direct component interconnection or through add-in boards.

In the depicted example, local area network (LAN) adapter 115, small computer system interface (SCSI) host bus adapter 116, and expansion bus interface 117 are connected to PCI local bus 114 by direct component connection. In contrast, audio adapter 118, graphics adapter 119, and audio/video adapter 120 are connected to PCI local bus 114 by add-in boards inserted into expansion slots. Expansion bus interface 117 provides a connection for a keyboard and mouse adapter 121, modem 122, and additional memory. SCSI host bus adapter 116 provides a connection for hard disk drive 124, tape drive 125, and CD-ROM drive 126. Typical PCI local bus implementations will support three or four PCI expansion slots or add-in connectors.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system. For example, the server 110, if optionally configured as a network computer, may not include SCSI host bus adapter 116, hard disk drive 124, tape drive 125, and CD-ROM 126. In that case, the computer, to be properly called a client computer, includes some type of network communication interface, such as LAN adapter 115, modem 122, wireless communicator 123 or the likes. An operating system runs on processor 111 and is used to coordinate and provide control of various components within client 110. The operating system may be a commercially available operating system such as Windows XP, which is available from Microsoft Corporation. An object oriented programming system such as Java may run in conjunction with the operating system and provides calls to the operating system from Java programs or applications executing on client 110. "Java" is a trademark of Sun Microsystems, Inc. Instructions for the operating system, the object-oriented programming system, and applications or programs are located on storage devices, such as hard disk drive 124, and may be loaded into main memory 112 for execution by processor 111.

The client 210, 220, 230 and 240 may have the same or similar structure as the above server 110, or other hardware structure, which is not limited here. For example, the client 210, 220, 230 and 240 may be implemented as computers, notebooks, personal digital assistant (PDA), smart phone, etc. It should be noted that the components shown in FIG. 2 are illustrated for exemplary purpose rather than restrictive.

It should be noted that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Below please refer to FIG. 3A-FIG. 3D and FIG. 4, which further illustrate flowcharts of the system mentioned above according to one embodiment of the present invention. The process of FIG. 3A starts in step 302, in which the client 210, 220, 230 and 240 respectively connect to and establish connections with the server 110. The server 110 may detect the connection attributes of each connection by using a detect module, such as a daemon program resided in the main memory 112. For example, the detect module may detects the type of connection, upload/download speed, stability, response time, etc. The detections for each client may be performed simultaneously or sequentially, or at any time upon a new client is connected, which are not limited here. In step 304, the server 110 may access the configuration data, if any, of each client as well as the default configuration data for the server itself. Based on configuration data and the result of detection, the transmission condition may be selected in step 306. Thereafter, the server 110 transmits the data, such as audio and/or video data to each client according to the selected transmission condition. The further details of configuration data and the selection of transmission condition will be discussed later. In addition, the configuration data may be stored in the storage unit of the server 110, such as the hard disk drive 124, tape drive 125, and CD-ROM drive 126.

Figure 5A:
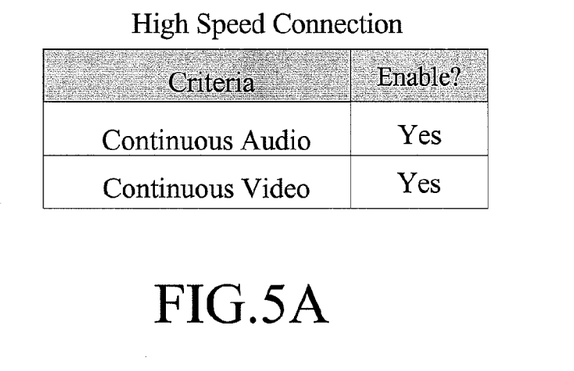
FIGS. 5A, 5B and 5C illustrate configuration data according to some embodiments of the present invention.
Figure 5B:
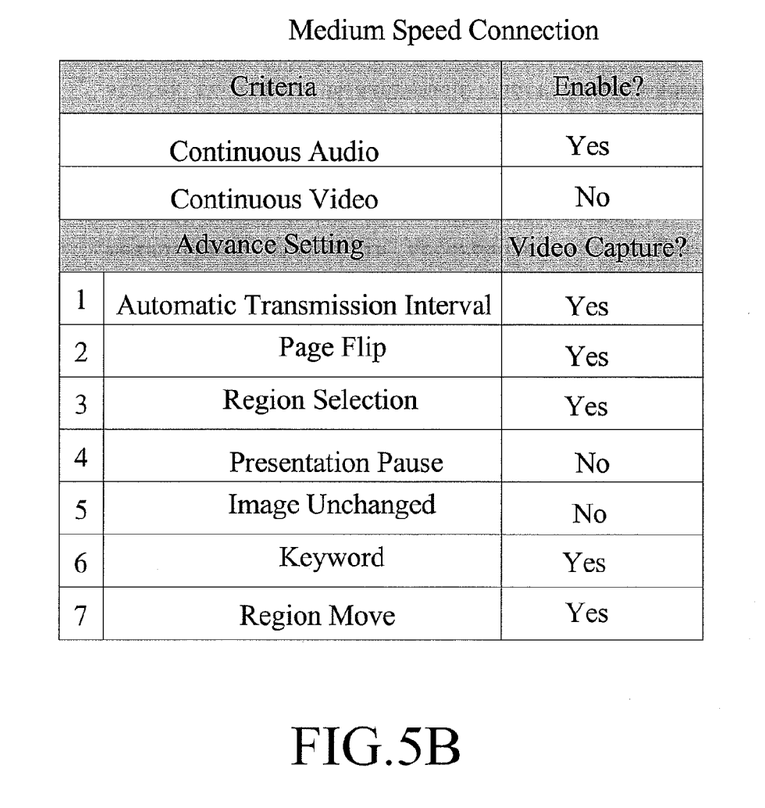
Figure 5C:
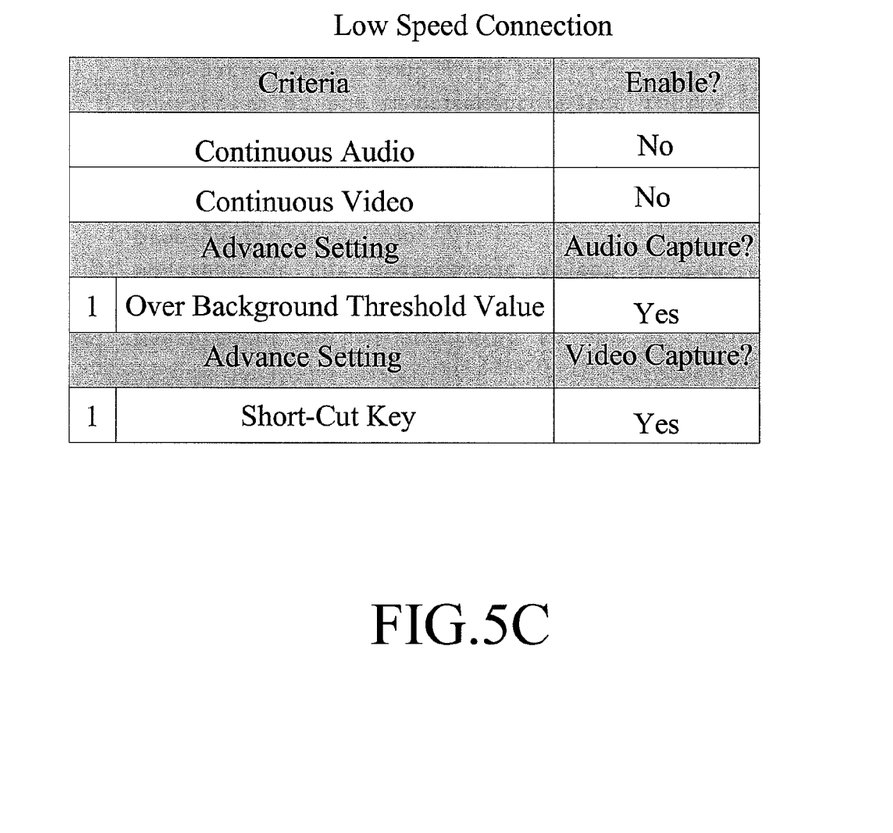

In this exemplary embodiment, the lecturer uses the client 210 to connect with the server 110 in order to hold the net meeting. The lecturer hopes to invite as more attendees as possible for introducing a new software prior to its official debut. Also, he wants each attendee may have a quality experience in real time no matter the connection speed is relatively high or low. Therefore, the lecturer sets three kinds of configuration data as shown in FIGS. 5A, 5B and 5C, which will be further elaborated later. Similarly, each client may set its preferred transmission conditions by setting its own configuration data, or alternatively, there may be also some default configuration data stored in the server 110. In this embodiment, the lecturer gives the first priority to his configuration data and thus the server 110 will use the configuration data provided by the lecturer in most conditions. Alternatively, the server 110 may give priority to the configuration data provided by the client for all or a part of transmission conditions, or other combination of priorities.

In this embodiment, the lecturer define the high speed connection for those speed over 10 Mbps/sec, the medium speed connection for those speed between 10 Mbps/sec and 2 Mbps/sec, and the low speed connection for those speed below 2 Mbps/sec. Of course, different definition may be used in other embodiment, such as more than three classifications. In addition, still other parameters may be taken into account for selecting the transmission conditions, such as the type of connection, stability of connection, identity of the attendee, location of the attendee, etc (collectively as the "connection attributes"). It should be noted that the roles of "lecturer" and "attendee" are used here for exemplary and illustrative purposes rather than restrictive. In other embodiments, it may be a manager with his team members, a teacher with his students, a newly wedded couple with their friends, etc. Therefore, the lecturer mentioned here and other person providing audio and/or video data may be collectively referred as the "Provider" and the attendee and other person receiving audio and/or video data may be collectively referred as the "Receiver". The audio and/or video data may be produced by any conventional method and/or device, such as the audio adapter 118, graphics adapter 119, and audio/video adapter 120.

Figure 3A:
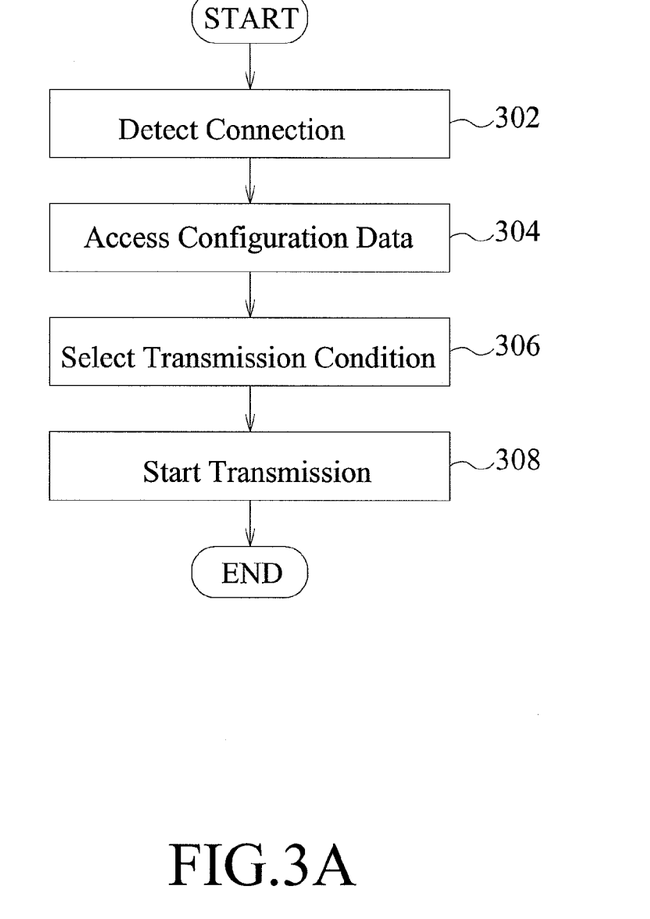
FIGS. 3A, 3B, 3C and 3D are flowcharts illustrating a method according to one embodiment of the present invention.
Figure 3B:
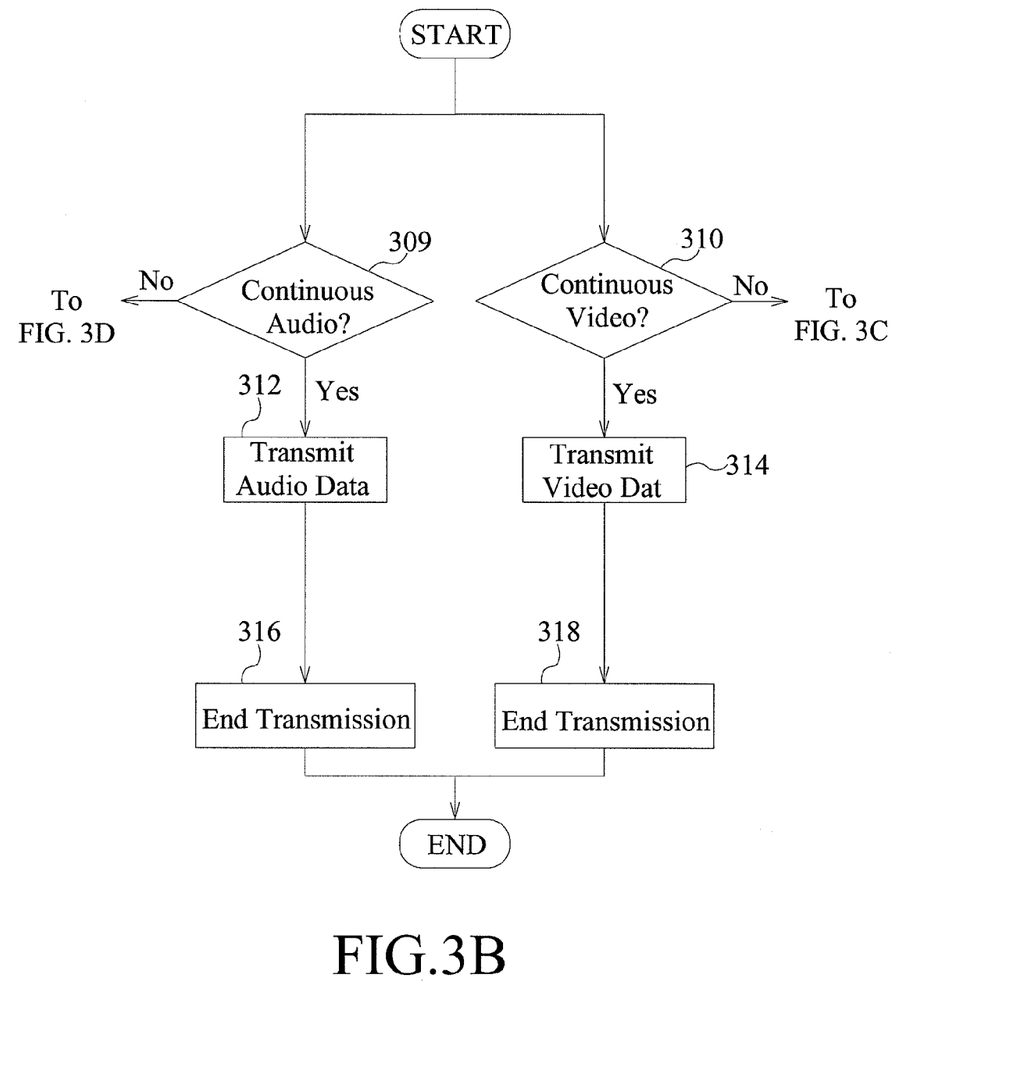
Figure 3C:
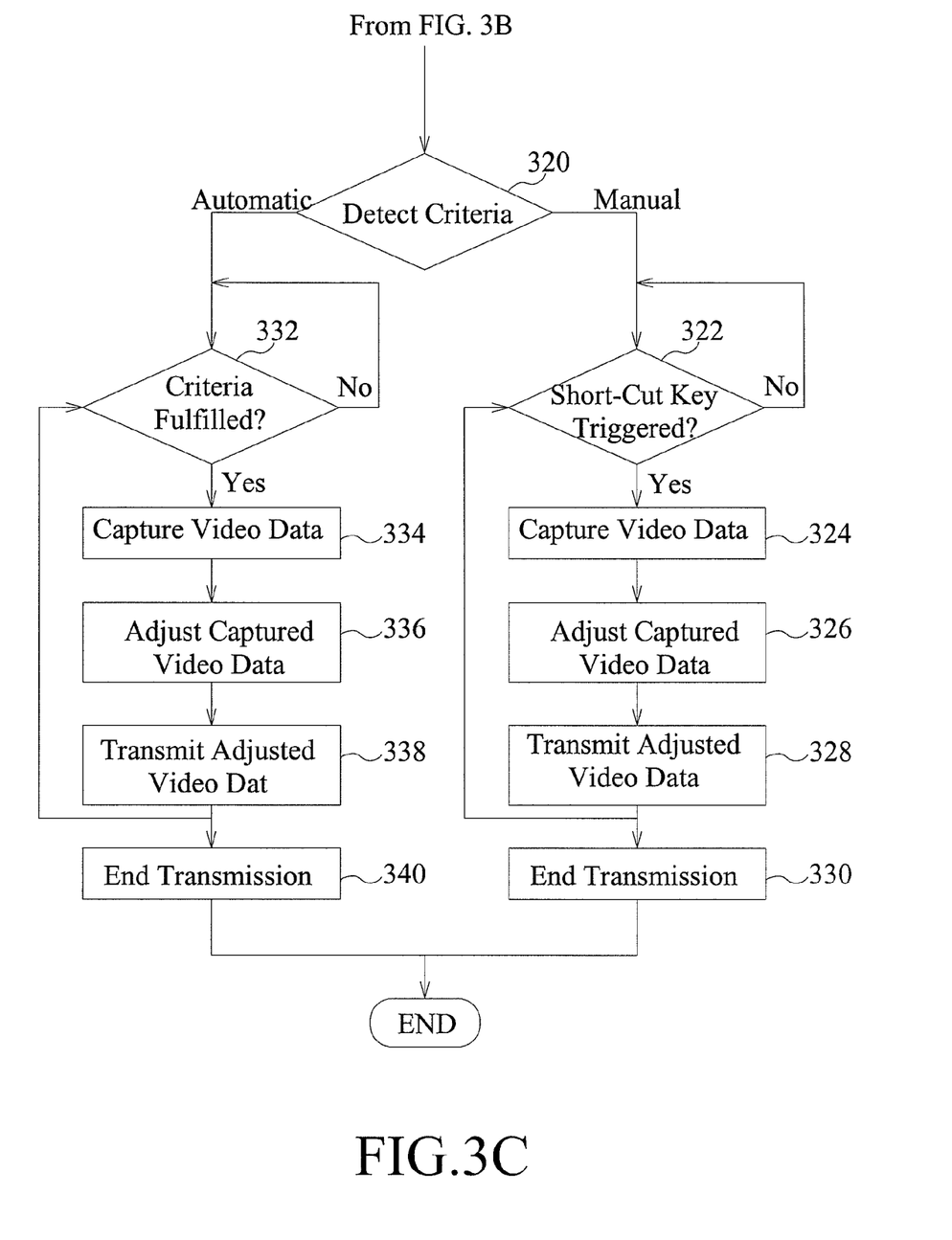

After the transmission condition is selected, the server 110 may transmit the data for the net meeting in step 308 in this embodiment. Now please refer to FIG. 2B for the transmission of data. In this embodiment, the server 110 checks the transmission condition in steps 309 and 310. For example, the server 110 detects the connection of client 230 is a high-speed connection in step 302 and determines the available transmission conditions in step 306 as the full performance as shown in FIG. 5A for attendee B. Therefore, the server 110 will use the condition of "continuous audio enabled" and continuous transmits the audio streaming data in step 312. Similarly, the server 110 will use the condition of "continuous video enabled" and continuous transmits the video streaming data in step 314. Therefore, the attendee B will experience the best quality during the meeting. The audio and/or video data may be transmitted through any traditional medium, such as the LAN adapter 115, modem 122, wireless communicator 123, etc. When the net meeting is finished, the server 110 stops the transmission of data in steps 316 and 318, and then the process is terminated.

For another attendee C, the server 110 detects the connection of client 240 is a medium speed connection in step 302 and determines the available transmission conditions in step 306 as the normal performance as shown in the FIG. 5B. Therefore, the server 110 will use the conditions of "continuous audio enabled" and "continuous video disabled" in steps 309 and 310. The server 110 will continuously transmits the audio streaming data in step 312 and transmits the video data according to the process as shown in the FIG. 3C based on the transmission conditions as shown in the FIG. 5B. In step 320, the server 110 checks the transmission conditions and confirms that the transmission conditions are not "manually input" and the process will proceed to step 332. The server 110 will automatically determine whether any of the criteria as shown in the "Advance Setting" in the FIG. 5B is fulfilled in step 332. The criteria are further explained as below.

1. Automatic Transmission Interval: The screenshot is captured repeatedly with a predetermined interval, such as every 30 seconds.

2. Page Flip: The screenshot is captured when the presentation proceeds to next page.

3. Region Selection: The screenshot is captured when the lecturer selects a region of the image on the screen.

4. Presentation Pause/Resume: The screenshot is captured when the lecturer resumes the presentation from a previous pause (i.e. the screen will not be captured when the lecturer pauses the presentation e.g. by pressing the pause key).

5. Image Change: The screenshot is captured when the image on the screen changes in whole or in part (i.e. the screen will not be captured when the image on the screen remain unchanged).

6. Keyword: The screenshot is captured when the lecturer says a keyword.

7. Region Move: The screenshot is captured when the lecturer moves a selected region of the image on the screen over a predetermined threshold distance.

Figure 4:
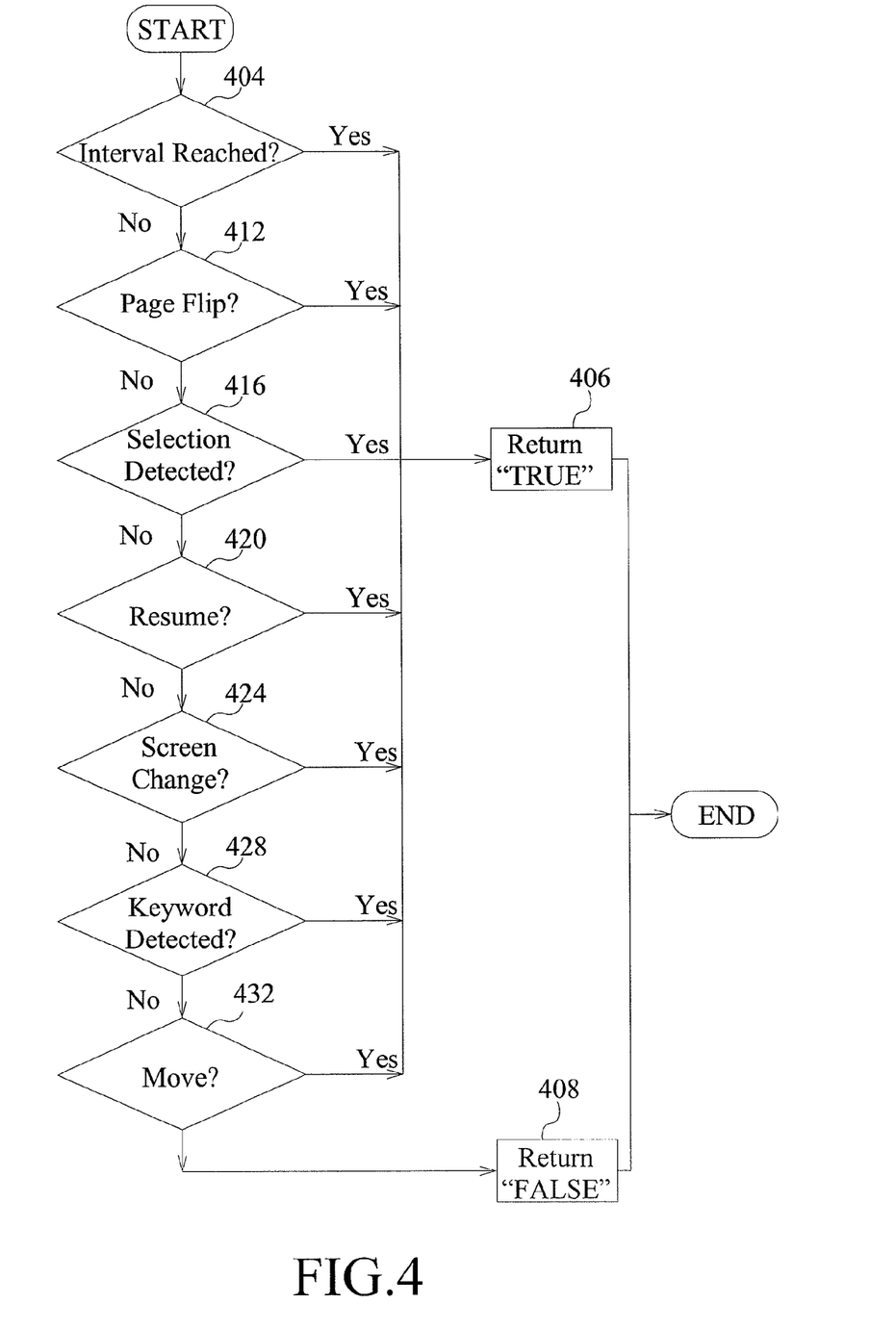
FIG. 4 illustrates a flowchart illustrating a method according to another embodiment of the present invention.

Please note that those criteria shown in the FIG. 5B are recited for only exemplary. purpose. The FIG. 4 illustrates a flowchart according to the criteria as shown in the FIG. 5B. The server 110 may detect whether any of the criteria is fulfilled by a daemon program resided in the main memory 112 and transmits the audio and/or video data according to the result of detection. In step 404, the server 110 detects whether the interval is reached. In other words, the process will proceed to step 406 every 30 seconds in this embodiment. If the interval is not reached yet, the process proceeds to step 412 to detect whether the lecturer proceeds to next page, i.e. whether the page is flipped. If the lecturer flips the page, the process proceeds to step 406, or otherwise the process proceeds to step 416 to detect whether the lecturer selects any region of the image on the screen. Similarly, the server 112 detects whether the presentation is resumed from a previous presentation pause in step 420, whether the image on the screen is changed in step 424, whether the lecturer says any keyword in step 428, and whether the lecturer moves the region selected for more than a predetermined threshold value in step 432. If the server 110 detects any of the above, the process proceeds to step 406 and returns a notice of "TRUE" to indicate any one of the criteria is fulfilled. If none of the above is detected, the process proceeds to step 408 and returns a notice of "FALSE" to indicate none of the criteria is fulfilled. It should be noted that the above process is recited for exemplary purpose and the process may be implemented in other sequences, or performed simultaneously, or even more criteria. For example, the process may further include a step to determine whether the lecturer initiates a pause/stop button, i.e. the screen capture is suspended or terminated, and a corresponding step to determine whether the lecturer initiates a resume/reply button, i.e. the screen capture is resumed or restarted correspondingly in another embodiment.

Now refer back to the FIG. 3C, when any one of criteria is fulfilled, the process proceeds to step 334 and a screenshot is captured from the video data. In step 336, the captured screenshot is adjusted into proper size, resolution, format or etc (collectively referred as the "file attributes") for efficiently transmitting over the network. The preferred file attributes may be assigned by the lecturer, automatically determined by the server 110, or alternatively determined by any other mechanism. The adjusted screenshot is transmitted to the client 240 in step 338. When the net meeting is finished, the server 110 stops the transmission of data in step 340, and then the process is terminated. Because the client 240 connects to the server 110 through a medium speed connection, the attendee C will experience the best quality of audio data transmission and a normal quality of video data transmission during the meeting while none of important moment is missing.

For the attendee A, the server 110 detects the connection of client 220 is a low speed connection in step 302 and determines the available transmission conditions in step 306 as the normal performance as shown in the FIG. 5C. Therefore, the server 110 will use the conditions of "continuous audio disabled" and "continuous video disabled" in steps 309 and 310. The server 110 will neither continuously transmits the audio streaming data nor the video streaming data and just transmits the data according to the process as shown in the FIG. 3C and FIG. 3D based on the transmission conditions as shown in the FIG. 5C. In step 320, the server 110 checks the transmission conditions and confirms that the transmission conditions for audio data are not "manually input" and those for video are. Therefore, the process for video transmission will proceed to step 322. The screenshot is captured only when the lecturer specifically triggered a short-cut key, such as the left button of the mouse, the "Enter" key of the keyboard, or any other predetermined input key. When the short-cut key is triggered, a screenshot is captured from the video data in step 324 and the captured screenshot is adjusted into proper file attributes in step 326 for efficiently transmitting over the network. The preferred file attributes may be assigned by the lecturer, automatically determined by the server 110, or alternatively determined by any other mechanism. The adjusted screenshot is transmitted to the client 220 in step 328.

Figure 3D:
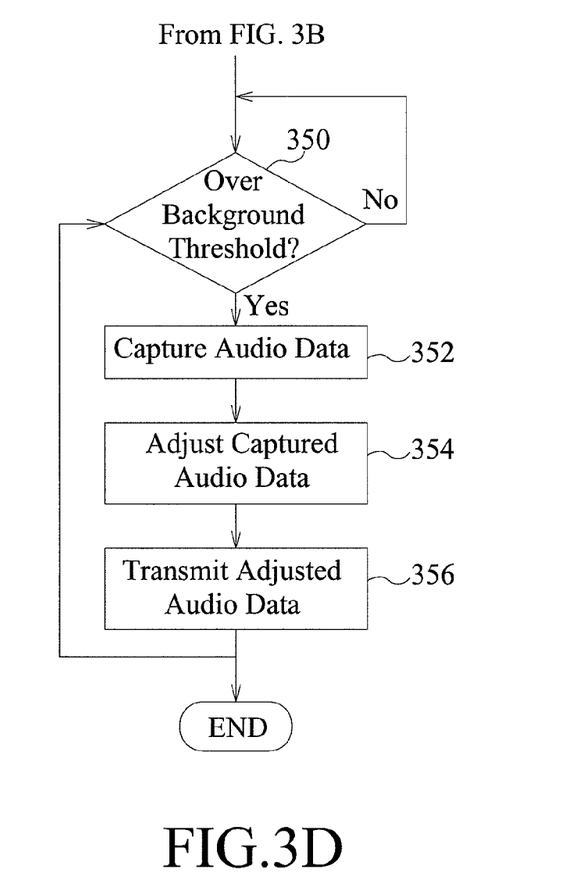

Further, the process for audio transmission is illustrated in the FIG. 3D based on the transmission conditions as shown in the FIG. 5C. In step 350, the server 110 detects whether the intensity of audio stream, such as the lecturer's speech recorded by a recording device and transmitted to the server 110, is over a background threshold value. When the intensity of audio stream is over such background threshold value, the server 110 will capture a segment of audio data in step 352 and adjust the captured segment into a proper file size, quality and format for efficiently transmitted over the network. In step 356, the adjusted segment is transmitted to the client 220. The capture of audio streaming data may be performed by any traditional method. For example, the server 110 may filter those parts below the background threshold value and transmit only those parts over the background threshold value to the attendee A. Therefore, the loading of data transmission may be reduced and the attendee A may still join the meeting even with a relatively low speed connection while none of the important information is missing.

The capture of audio and/or video data may be performed by any conventional method and/or device, such as the audio adapter 118, graphics adapter 119, and audio/video adapter 120, or any similar components on the client 210. When the client 220 receives the captured audio and video data, they can be further synchronized, such as "Audio and Video Synchronization" (http://en.wikipedia.org/wiki/Audio_video_sync) and "MPEG-2: Presentation Time Stamp (PTS), Decode Time Stamp (DTS)" (http://en.wikipedia.org/wiki/Audio_video_sync#MPEG-2:_Presentation_Time_Stamp_0.28PTS.29.2C_Decode_Time_Stamp_0.28DTS 0.29).

In this embodiment, all attendees with different connection device may still join the net meeting at the same time while receive all important information in real time. By means of configuration data, the network bandwidth may be utilized in efficient way and allow as more as possible attendees joining the meeting. Comparing to traditional videoconference, the attendee cannot review the meeting unless additional recording equipment is used. However, the captured screenshots can be easily transmitted to the attendee and then automatically stored for further references. For example, if the lecturer shows a presentation file (such as a PPT file) during the meeting, the embodiment of the present invention allows the attendee to store all screenshots to recreate the presentation file.

Figure 6:
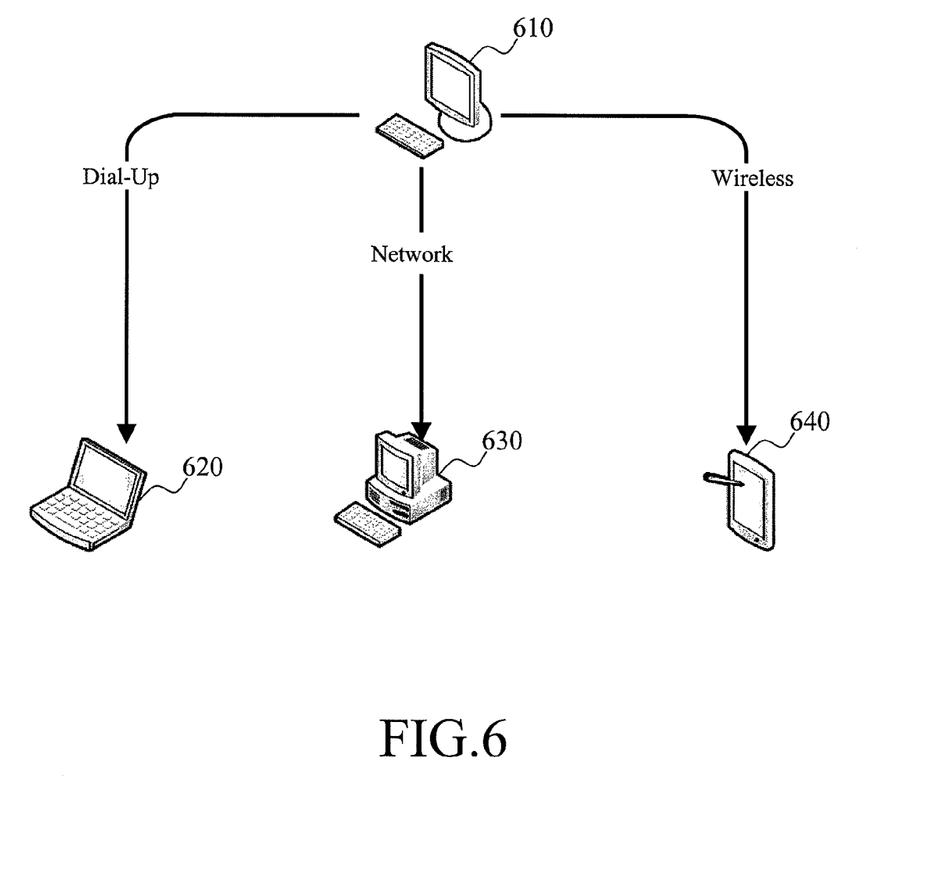
FIG. 6 is an exemplary diagram of system according to another embodiment of the present invention.

Those skilled in the art should understand that the above details are only illustrated fur exemplary purpose rather than limitation. There are still various variations modifications may be performed without escaping from the scope of the present invention. For example, the FIG. 6 illustrates another embodiment of the present invention. In this embodiment, the lecturer directly uses its desktop computer in replace of the server 110 as described in the above embodiment (hereinafter referred as the "server side 610"). The server side 610 connects directly with the attendees' notebook ("client 620"), desktop computer ("client 630"), and handheld device ("client 640"). In other words, the server side 610 may perform the role as the server 110 as mentioned above without affecting the implementation of the present invention. Alternatively, more than on servers 110 may be used to share the loading of data transmission and other tasks. In addition, the present invention may be implemented with any existing remote application, such as the Lotus Sametime™ provided by IBM.

The description shown above is only about the preferred embodiments of the present invention and is not intended to limit the scope of the invention. Any equivalent variations or modifications without departing from the spirit disclosed by the present invention should be included in the appended claims.

We claim:

1. A method for transmitting a presentation between a lecturer and attendees within a remote application, comprising the following steps:
   a computer detecting a connection attribute from a receiver, wherein the computer conducts the presentation within the remote application;
   the computer determining, responsive to the connection attribute, when to capture a screenshot of the presentation, wherein the connection attribute specifies a condition when the screenshot of the presentation is captured, wherein the condition is selected from a group consisting of: a designated time interval elapsing, the presentation proceeding to a next page on a display, the lecturer selecting a region of an image on the display, the lecturer resuming the presentation from a pause, all or a portion of an image on the display changing, the lecturer using a keyword, and the lecturer moving a region of the image over a predetermined distance on the display;
   responsive to a determination that the condition is fulfilled, capturing the screenshot from a video stream; and
   responsive to capturing the screenshot from the video stream, transmitting the captured screenshot to the receiver.

2. The method according to claim 1, wherein the step of selecting the condition further comprises:
   accessing a set of configuration data having a plurality of conditions; and
   selecting the condition according to the detected connection attribute with the set of configuration data.

3. The method according to claim 2, wherein at least a part of the configuration data is selected from at least one of the followings: a configuration data set by a provider, a configuration data set by the receiver, and a default transmission condition.

4. The method according to claim 1, wherein the step of transmitting the captured screenshot comprises:
   upon triggering a short-cut key, sending a signal notifying that the available transmission condition is accomplished.

5. The method according to claim 1, wherein the step of transmitting further comprises:
   when the transmission condition is identified as the video stream, continuously transmitting the video stream as video data to the receiver.

6. The method according to claim 1, wherein the step of transmitting the captured screen shot further comprises:
   when the transmission condition is identified as an audio stream, continuously transmitting the audio stream as audio data to the receiver.

7. The method according to claim 1, further comprising the step of adjusting the captured screenshot into a preferred file attribute.

8. The method according to claim 1, wherein the step of transmitting the captured screenshot further comprises:
   capturing a segment of an audio stream when an intensity of the audio stream exceeds a background threshold value; and
   transmitting the captured segment as audio data to the receiver.

9. A computer program product having a program code for transmitting a presentation between a lecturer and attendees within a remote application, the computer program product comprising:
   one or more non-tangible computer readable storage devices;
   computer program instructions stored in at least one non-tangible computer readable storage device for detecting a connection attribute from a receiver, wherein the computer conducts the presentation within the remote application;
   computer program instructions stored in at least one non-tangible computer readable storage device for the computer program instructions stored in at least one non-tangible computer readable storage device for determining, responsive to the connection attribute, when to capture a screenshot of the presentation, wherein the connection attribute specifies a condition when the screenshot of the presentation is captured, wherein the condition is selected from a group consisting of: a designated time interval elapsing, the presentation proceeding to a next page on a display, the lecturer selecting a region of an image on the display, the lecturer resuming the presentation from a pause, all or a portion of an image on the display changing, the lecturer using a keyword, and the lecturer moving a region of the image over a predetermined distance on the display;
   computer program instructions stored in at least one non-tangible computer readable storage device for capturing, responsive to a determination that the condition is fulfilled, the screenshot from a video stream; and
   computer program instructions stored in at least one non-tangible computer readable storage device for transmitting, responsive to capturing the screenshot from the video stream, the captured screenshot to the receiver.

10. The computer program product according to claim 9, further comprising:
    computer program instructions stored in at least one computer readable storage device for accessing a set of configuration data having a plurality of predetermined transmission conditions; and computer program instructions stored in at least one computer readable storage device for selecting the available transmission condition according to the detected connection attribute with the set of configuration data.

11. The computer program product according to claim 9, further comprising:

computer program instructions stored in at least one computer readable storage device for sending responsive to a short-cut key being triggered, a signal notifying that the available transmission condition is accomplished.

12. The computer program product according to claim 9, further comprises:

computer program instructions stored in at least one computer readable storage device for, responsive to the transmission condition being identified as a video stream, continuously transmitting the video stream as video data to the receiver.

13. The computer program product according to claim 9, further comprises:

computer program instructions stored in at least one computer readable storage device for continuously transmitting, responsive to the condition being identified as an audio stream, the audio stream as audio data to the receiver.

14. The computer program product according to claim 9, further comprises:

computer program instructions stored in at least one computer readable storage device for adjusting the captured screenshot into a preferred file attribute.

15. The computer program product according to claim 9, wherein the program code is executed for further performing the step of further comprises:

computer program instructions stored in at least one computer readable storage device for capturing a segment of the audio stream when the intensity of audio stream exceeds background threshold value; and computer program instructions stored in at least one computer readable storage device for transmitting the captured segment as audio data to the receiver.

16. A device for coupling to a receiver and transmitting a presentation between a lecturer and attendees within a remote application, comprising:

a detecting module for detecting a connection attribute with the receiver; and a transmitting module for transmitting the presentation to the receiver responsive to a determination that a condition is fulfilled;

one or more processors, one or more computer readable memories, and one or more computer readable storage devices;

computer program instructions stored in at least one computer readable storage device for execution by at least one processor via at least one memory for detecting the connection attribute from the receiver, wherein the computer conducts the presentation within the remote application and the receiver is a computer of an attendee to the presentation;

computer program instructions stored in at least one computer readable storage device for execution by at least one processor via at least one memory for determining, responsive to the connection attribute, when to capture a screenshot of the presentation, wherein the connection attribute specifies a condition when the screenshot of the presentation is captured, wherein the condition is selected from a group consisting of: a designated time interval has elapsing, the presentation proceeding to a next page on a display, the lecturer selecting a region of an image on the display, the lecturer resuming the presentation from a pause, all or a portion of an image on the display changing, the lecturer using a keyword, and the lecturer moving a region of the image over a predetermined distance on the display;

computer program instructions stored in at least one computer readable storage device for execution by at least one processor via at least one memory for capturing, responsive to a determination that the condition is fulfilled, the screenshot from a video stream; and computer program instructions stored in at least one computer readable storage device for execution by at least one processor via at least one memory for transmitting, responsive to capturing the screenshot from the video stream, the captured screenshot to the receiver.

17. The device according to claim 16, further comprising:

a storage unit for storing a set of configuration data having a plurality of predetermined transmission conditions; and computer program instructions stored on at least one computer readable storage device for execution by at least one processor via at least one computer readable memory for transmitting the captured screenshot as video data to the receiver; and computer program instructions stored on at least one computer readable storage device for execution by at least one processor via at least one computer readable memory for selecting the condition according to the detected connection attribute with the set of configuration data.

18. The device according to claim 16, further comprising:

a video capturing unit for capturing the screenshot from the video stream so that the captured screenshot is transmitted as video data to the receiver.

19. The device according to claim 16, further comprising:

an audio capturing unit for capturing a segment of the audio stream when an intensity of an audio stream exceeds a background threshold value so that the captured segment is transmitted as audio data to the receiver.

20. The device according to claim 16, further comprising:

an input unit with a short-cut key to be triggered by a user;

computer program instructions stored on at least one computer readable storage device for execution by at least one processor via at least one computer readable memory for transmitting, responsive to the short-cut key being triggered, a to notify that the condition is accomplished.

* * * * *